3,344,151
PROCESS FOR SEPARATING TOCOPHEROL
EPIMERS
Donald R. Nelan, Rochester, N.Y., assignor to Eastman Kodak Company, Rochester, N.Y., a corporation of New Jersey
No Drawing. Filed July 2, 1965, Ser. No. 469,316
13 Claims. (Cl. 260—345.6)

This invention resides in the chemical arts. More particularly, it relates to that branch of organic chemistry having to do with tocopherols.

α-Tocopherol is a well-known compound which is represented by the following structural formula:

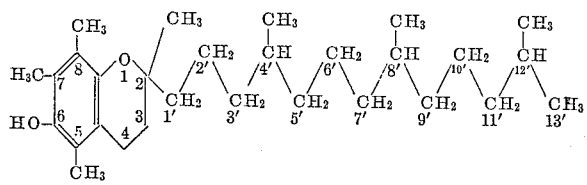

The carbon atoms at the 2, 4' and 8' positions are asymmetric. Consequently, α-tocopherol can exist in eight, different, optical isomer forms.

α-Tocopherol synthesized by condensation of trimethylhydroquinone and natural phytol is a mixture of diastereoisomers. The mixture is racemic, giving in most solvents a specific rotation of zero, wherefore, this synthetic material has been designated as dl-α-tocopherol. (Naturally occurring α-tocopherol has been designated as d-α-tocopherol due to the small dextro rotation observed in most solvents.) This mixture consists of two diastereoisomers, or epimers, at a 50:50 weight ratio and they are identified herein as 2d,4'd,8'd-α-tocopherol (or the 2d epimer) and 2l,4'd,8'd-α-tocopherol (or the 2l epimer). For convenience dl-α-tocopherol such as that made from trimethylhydroquinone and natural phytol, which consists of these two epimers at a 50:50 weight ratio, is referred to herein as 2dl-α-tocopherol.

Before proceeding further it should be noted that diastereoisomers that differ in configuration at only one asymmetric center or carbon are sometimes called epimers. The term epimers originated in the physical chemistry of the sugars and was defined as sugars which differed in configuration at one carbon atom, such as, for example, glucose and mannose. As employed herein epimer refers to a diastereoisomer that differs from another diastereoisomer at only one asymmetric carbon, and epimeric material refers to material consisting essentially of two diastereoisomers that are epimers.

α-Tocopherol and esters thereof have vitamin E activity. However, the vitamin E potency varies according to the optical isomer or isomers involved. This fact is reflected in the National Formulary, eleventh edition, on page 459, wherein these equivalents are given:

1 milligram of d-α-tocopherol=1.49 International Units of Vitamin E
1 milligram of dl-α-tocopherol=1.1 International Units of Vitamin E
1 milligram of d-α-tocopherol acetate=1.36 International Units of Vitamin E
1 milligram of dl-α-tocopherol acetate=1.0 International Units of Vitamin E.

Thus, dl-α-tocopherol has only about 73.8% of the biological activity of an equal weight quantity of d-α-tocopherol while dl-α-tocopheryl acetate has only 73.5% of the biological activity of an equal quantity of d-α-tocopheryl acetate. The reason for these differences in biological activity is the presence of the l isomer in the synthetic material and the acetate ester thereof. In this regard it has been established that l-α-tocopherol and its acetate ester have less biological activities than d-α-tocopherol and its acetate ester.

One problem, therefore, to which this invention provides a solution is that of separating the 2d epimer from the 2l epimer of 2dl-α-tocopherol and esters thereof.

One solution to this problem is reported in the U.S. Patent No. 3,153,053, to Robeson and Nelan. It is disclosed in this patent that piperazine compounds selected from the group consisting of piperazine and C-methyl and C-ethyl substituted piperazines react with 6-chromanols in the absence of water to form crystallizable complexes. The separation process described in this patent is based on the fact that at the temperature of crystallization more of the piperazine complex of one of the epimers is crystallized than the piperazine complex of the other of the epimers. However, the difference in quantities crystallized is not as great as desired, with the result that the yields in each crystallization step are not as large as is desired and more crystallization steps must be employed in order to obtain a substantially pure product.

Another solution to this problem is reported in the U.S. Patent No. 2,215,398, to Karrer. The separation process disclosed here calls for the esterification of the epimers with an optically active acid such as 3-bromo-d-camphor sulfonic acid. A disadvantage of this process is that optically active acids are usually expensive.

Consequently, there is a need for a process for the resolution of 2 dl-α-tocopherol and esters thereof, which process avoids these disadvantages.

An object of this invention is to provide such a process.

A specific object of this invention is to provide a process for increasing the concentration of one of the epimers relative to the other of the epimers of 2dl-α-tocopherol and esters thereof.

Another specific object of this invention is to provide a process for separating the 2d epimer from the 2l epimer of 2dl-α-tocopherol and esters thereof, which process can be readily performed with relatively inexpensive materials with a minimum number of steps and with high yields.

These and other objects as may appear as this specification proceeds are achieved by this invention which is based upon the discovery that the 2d and 2l epimers of 2dl-α-tocopherol, crystallizable esters of 2dl-α-tocopherol and certain optically inactive acids, and crystallizable salts of the acid succinate ester of 2dl-α-tocopherol have substantially different solubilities in solvents therefor and that they fractionally crystallize from solvent solutions thereof. In most cases the 2d epimer of these materials is less soluble in solvents therefor than the 2l epimer, wherefore, under crystallization conditions the 2d epimer tends to be concentrated in the insoluble fraction, particularly if the solutions are seeded with one or more crystals of the 2d epimer of the material involved. The only exception to this finding appears to be in the case of the 2d and 2l acid succinate esters, wherein the 2l epimer crystallizes preferentially.

In summary, this invention comprises a process for obtaining from epimeric material selected from a group of epimeric materials, hereinafter referred to as "the specified group," a product wherein one epimer is at a weight ratio relative to the other epimer substantially greater than the weight ratio of said epimer to the other epimer in said epimeric material. "The specified group" consists of (1) mixtures of 2d-α-tocopherol and 2l-α-tocopherol, (2) epimeric mixtures of a crystallizable ester of 2d-α-tocopherol and an optically inactive acid, and a crystallizable ester of 2l-α-tocopherol and said acid, said acid being selected from the group consisting of saturated aliphatic carboxylic acids having 1–24 carbon atoms, benzoic acid, p-phenylazobenzoic acid and succinic acid, and (3) epimeric mixtures of a crystallizable salt of a base and the acid succinate ester of 2d-α-tocopherol, and a crystallizable salt of said base and the acid succinate ester of 2l-α-tocopherol. Crystallizable salts of the acid succinate esters of 2d- and 2l-α-tocopherols are obtained by the neutralization of the acid succinate esters with inorganic and organic bases. Examples of organic bases include piperazine, morpholine, ethanolamine, and the like. The process comprises dissolving said material in a crystallization solvent therefor; changing the temperature of said solution to a temperature at which a substantial quantity of one of said epimers is insoluble, whereby crystalline solids are precipitated; and, preferably when precipitation is substantially complete, separating crystalline solids from the resulting mother liquor. The solids thus obtained comprise said one of said epimers at an increased weight ratio relative to the other of said epimers. In preferred embodiments of the process, the step of changing the temperature also includes seeding the solution with one or more crystals of the epimer of increased weight ratio in the subsequently precipitated crystalline solids.

The crystallization solvent is material which is liquid at the temperatures involved in the practice of this process, which is inert relative to the materials of "the specified group" under the conditions involved in the practice of this process, and which at one temperature dissolves substantial quantities of said materials and at a different temperature, the crystallization temperature, crystallizes substantial quantities of said materials. The solvent can be one compound or a mixture of compounds. Examples of a crystallization solvent include methanol, ethanol, acetone, isooctane, hexane, isopropanol, methyl ethyl ketone, lower formate esters, dimethoxy ethane, acetonitrile, and the like.

This invention also comprises a process for separating one of the two epimers from the other of the two epimers of material selected from the specified group. This process comprises repeating the foregoing procedure relative to the crystalline solids until a crystalline product is obtained which consists essentially of said one of the two epimers substantially free of the other of the two epimers.

This invention is further illustrated by the following working examples, which include specific embodiments of the process of this invention. This invention is not limited to these specific embodiments unless otherwise indicated.

Example 1

This example illustrates the isolation according to a specific embodiment of a process of this invention of 2d-α-tocopheryl acetate from a 2dl-α-tocopheryl acetate concentrate. It also illustrates the separation of 2l epimer from the concentrate according to a specific embodiment of a process of this invention.

102 grams of a 2dl-α-tocopheryl acetate concentrate made by reacting with pyridine as a catalyst 2dl-α-tocopherol (prepared as by condensing trimethylhydroquinone and natural phytol followed by distillation of the condensate in a molecular still) and acetic anhydride, and having a purity of about 98% is dissolved in 500 milliliters of ethanol at 20–25° C. The temperature of the resulting solution is changed to −20° C. and the solution is held for 72 hours at this temperature. During this period of time, crystalline solids precipitate from the solution. The crystalline solids are separated from the mother liquor by filtration and residual solvent removed therefrom at reduced pressure at 5° C. A typical quantity of the crystalline fraction thus obtained is 88.3 grams. Typically, it is enriched in the 2d epimer, a typical weight ratio of the 2d epimer to the 2l epimer being 51:49. The crystalline fraction is dissolved in 440 milliliters of ethanol at 20–25° C. and the resulting solution is cooled to −20° C. It is then seeded with crystals of 2d-α-tocopheryl acetate and the seeded solution held at this temperature for 10 days. During this period of time crystalline solids precipitate. The crystalline solids are filtered from the mother liquor and residual solvent removed therefrom under reduced ambient pressure at 5° C. A typical quantity of crystalline solids thus obtained is 39.9 grams and typically the crystalline solids have a weight ratio of the 2d epimer to the 2l epimer of 64:36. The procedure is repeated to further concentrate the 2d epimer. Conditions and typical data obtained in repeating this fractional crystallization procedure (dissolving at 20–25° C., crystallizing at −20° C., filtering and removing solvent by vacuum at 5° C.) are summarized in the following table:

| Crystallization Step | Volume in Milliliters of Ethanol | Weight in Grams of Crystalline Solids Dissolved | Crystallization Time in Hours | Weight in Grams of Crystalline Solids Obtained | Specific Rotation Value ($[\alpha]_D^{25°}$) of Crystalline Solids Obtained | Optical Purity (in percent by weight) of Crystalline Solids Obtained |
|---|---|---|---|---|---|---|
| 3 | 240 | 39.9 | 192 | 18.9 | +2.5 | 87 |
| 4 | 94 | 18.9 | 24 | 15.2 | +2.83 | 93 |
| 5 | 80 | 15.2 | 24 | 12.2 | +3.11 | 98 |
| 6 | 58 | 12.2 | 120 | 8.9 | +3.20 | 100 |

The fractional crystallization procedure of this invention is useful in separating the 2d epimer from the 2l epimer in the chemical conversion of the 2l epimer to the 2d epimer under conditions wherein an epimeric mixture is obtained. One process for effecting such a chemical conversion comprises the steps of oxidizing 2l-α-tocopherol to the corresponding tocoquinone, reducing the 2l-α-tocoquinone to the corresponding hydroquinone and cyclizing the 2l-α-tocohydroquinone under conditions which result in the formation of the 2d epimer. These conditions are such that a substantial proportion of the 2l-α-tocohydroquinone is also converted to a substantial quantity of the 2l epimer. The resulting mixture of 2d and 2l epimers is fractionally crystallized according to this invention to separate therefrom the 2d epimer. The 2l epimer which remains is preferably recycled through the chemical conversion process.

The end product of crystalline solids typically has a melting point of 27–28° C. This and the typical specific rotation value thereof indicate it to be identical with α-tocopheryl acetate obtained from natural α-tocopherol. Furthermore, the crystalline product typically has the same biological potency as natural α-tocopheryl acetate as determined by the standard, rat anti-sterility assay.

The filtrates resulting from all the foregoing crystallization steps are combined. Part or all of the solvent is removed therefrom at reduced pressure at 5° C. It is not necessary to remove all of the solvent; enough is removed so that on substantial reduction of the solution temperature a substantial quantity of dissolved crystalline material will precipitate. However, for the purpose of demonstrating this embodiment of the invention, it is preferred to remove all of the solvent. In such case, the residue is α-tocopheryl acetate material, a typical quantity of which is 48 grams. It consists essentially of 2d-α-tocopheryl acetate and 2l-α-tocopheryl acetate at a typical weight ratio of 40:60. This material is dissolved in 150 milliliters of ethanol. The resulting solution is cooled to −20° C. and the cooled solution is seeded with crystals of 2l-α-tocopheryl acetate. The seeded solution is then stored at −20° C. for twenty-four hours. During this time, crystalline solids precipitate from the solution. The crystalline solids are filtered to give a product rich in the 2l epimer. A typical quantity of the product thus obtained is 22 grams. A typical specific rotation of the product is $[\alpha]_D^{25°} = -0.60°$, which indicates an optical purity of 72% by weight of the 2l epimer. The fractional crystallization procedure is repeated four more times, the quantities of solvent and solids dissolved, the crystallization times, typical quantities of crystalline solids obtained, specific rotation of the solids obtained and typical optical purities of the solids obtained are summarized in the following table.

| Crystallization Step | Volume in Milliliters of Ethanol | Weight in Grams of Crystalline Solids Dissolved | Crystallization Time in Hours | Weight in Grams of Crystalline Solids Obtained | Specific Rotation Value ($[\alpha]_D^{25°}$) of Crystalline Solids Obtained | Optical Purity (in percent by weight) of Crystalline Solids Obtained |
|---|---|---|---|---|---|---|
| 2 | 110 | 22 | 72 | 10 | −1.67 | 92 |
| 3 | 50 | 10 | 72 | 6.8 | −1.89 | 96 |
| 4 | 33 | 6.8 | 120 | 6.0 | −1.94 | 97 |
| 5 | 15 | 6.0 | 48 | 5.3 | −2.0 | 100 |

The specific rotation value of −2.0° of the product of the fifth crystallization step is not changed by further crystallization. The melting point of the fifth crystallization step product typically is 22–23° C. This product consists essentially of 2l-α-tocopheryl acetate.

Example 2

This example illustrates the preparation according to a specific embodiment of a process of this invention of a 2d-α-tocopherol concentrate from material comprising 2d-α-tocopherol and 2l-α-tocopherol at a weight ratio of 78:22.

8.2 grams of material consisting essentially of 2d-α-tocopherol and 2l-α-tocopherol at a weight ratio of 78:22 are dissolved in 75 milliliters of methanol and the resulting solution cooled to −20° C. A seed crystal of 2d-α-tocopherol is added to the cooled solution and the seeded solution is held for 4 days at −20° C. During this time crystalline solids precipitate. The crystalline solids are separated from the mother liquor at +5° C. The crystalline solids are allowed to melt and residual solvent is removed in vacuo at 20–25° C. The result is a 2d-α-tocopherol concentrate wherein the weight ratio of the 2d epimer to the 2l epimer is 94:6. A typical quantity of concentrate thus obtained is 4.0 grams.

Similar results are obtained in the case of 2dl-α-tocopheryl palmitate with the crystallization solvent being acetone at a volumetric ratio of solvent to the palmitate material of 20:1 and the temperature of crystallization being 5° C.; 2dl-α-tocopheryl benzoate when employing as the crystallization solvent ethanol at a volumetric ratio of 6:1 and a crystallization temperature of −20° C.; and 2dl-α-tocopheryl p-phenylazobenzoate wherein the crystallization solvent is isooctane at a volumetric ratio of 5:1 and the crystallization temperature is 5° C.

In the case of 2dl-α-tocopheryl acid succinate wherein the crystallization solvent is hexane at a volumetric ratio of solvent to the succinate ester of 15:1 and the crystallization temperature is 5° C., crystalline solids are obtained wherein the weight ratio of the 2l epimer to the 2d epimer is increased over that which prevailed before crystallization.

Example 3

This example illustrates a specific embodiment of the process for converting 2l-α-tocopherol to 2d-α-tocopherol employing a specific embodiment of a fractional crystallization procedure of this invention.

4.87 grams of 2l-α-tocopherol having 100% purity by the Emmerie-Engel assay and having a typical light absorption value of E(1%, 1 cm., isooctane) (292 mμ) =73.9 is oxidized with ferric chloride in a two-phase solvent system according to the procedure and conditions disclosed in the U.S. Patent No. 2,856,414, to Robeson et al. The result is a product consisting essentially of 2l-α-tocoquinone. A typical quantity of the product is 5.04 grams. A typical light absorption value is E(1%, 1 cm., isooctane) (269 mμ)=409. A typical specific rotation value of the product is $[\alpha]_D^{25°}=-1.64°$ (isooctane, c=10).

The 2l-α-tocoquinone product is dissolved in 55 milliliters of isopropyl ether in a separatory funnel and admixed with 2.5 grams of sodium hydrosulfite in 50 milliliters of water at 20–25° C. for 30 minutes. The aqueous phase is drawn off and discarded, and the residue is admixed three more times with fresh aqueous solutions of sodium hydrosulfite. The isopropyl ether solution which results is washed with three 20 milliliter portions of water, dried with anhydrous sodium sulfate, filtered, and diluted with an additional 55 milliliters of isopropyl ether.

5.0 grams of fused zinc chloride and 1.0 gram of zinc dust are added to the isopropyl ether solution and the resulting mixture refluxed for 24 hours on a steam bath. 2 milliliters of concentrated hydrochloric acid are added cautiously to the resulting reaction mixture and reflux is continued for another 4 hours. The mixture thus obtained is poured on ice, the ether layer separated, washed 3 times with water, dried with sodium sulfate, filtered and the isopropyl ether removed by distillation under vacuum. The product remaining consists essentially of 2d-α-tocopherol and 2l-α-tocopherol.

The product is esterified by reacting it with acetic anhydride and pyridine as a catalyst. A typical quantity of the acetate ester product obtained is 5.5 grams, a typical light absorption value of the ester product is E(1%, 1 cm., ethanol) (283 mμ)=42.1, and a typical specific rotation value is $[\alpha]_D^{25°}=+1.81°$ (ethanol, c=10). From the specific rotation value, it is apparent that the weight ratio of the 2d epimer to the 2l epimer is 73:27.

The product is then subjected to fractional crystallization according to the process of this invention, each crystallization step being performed at −20° C., the number of crystallization steps, other conditions of crystallization and typical data being summarized in the following table:

| Crystallization Step | Volume in Milliliters of Ethanol | Weight in Grams of Crystalline Solids Dissolved | Crystallization Time in Hours | Weight in Grams of Crystalline Solids Obtained | Specific Rotation Value ($[\alpha]_D^{25°}$) of Crystalline Solids Obtained | Optical Purity (in percent by weight) of Crystalline Solids Obtained |
|---|---|---|---|---|---|---|
| 1 | 5 | 5.50 | 120 | 3.06 | +2.83 | 93 |
| 2 | 5 | 3.06 | 24 | 2.47 | +3.11 | 98 |
| 3 | 5 | 2.47 | 24 | 2.24 | +3.20 | 100 |

The crystalline product resulting from the fractional crystallization process consists essentially of 2d-α-tocopheryl acetate.

The filtrates from the crystallization steps are combined, solvent removed therefrom by evaporation under vacuum, the residue saponified by the procedure described in the National Formulary, eleventh edition, on page 378, and the conversion process repeated on the resulting 2l=α=tocopheral material either alone or with added 2l-α-tocopherol material. By such recycling in combination with the fractional crystallization process of this invention, 2l-α-tocopherol is converted to 2d-α-tocopherol.

Thus, there is provided a process for resolving 2dl-α-tocopherol, certain crystallizable esters thereof and crystallizable salts of the acid succinate ester thereof. In addition, there is provided a process for increasing the weight ratio of one of the epimers to the other of the epimers in a mixture of the epimers of 2dl-α-tocopherol, certain crystallizable esters thereof and crystallizable salts of the acid succinate ester thereof.

Other features, advantages, and specific embodiments of this invention will be readily apparent to those in the exercise of ordinary skill in the art after reading the foregoing disclosures. In this connection, while specific embodiments of this invention have been described in considerable detail, variations and modifications of these embodiments can be effected without departing from the spirit and scope of the invention as disclosed and claimed.

I claim:

1. A process for obtaining from epimeric material selected from the group consisting of (1) mixtures of 2d-α-tocopherol and 2l-α-tocopherol, (2) epimeric mixtures of a crystallizable ester of 2d-α-tocopherol and an optically inactive acid, and a crystallizable ester of 2l-α-tocopherol and said acid, said acid being selected from the group consisting of saturated aliphatic carboxylic acids having 1–24 carbon atoms, benzoic acid, p-phenylazobenzoic acid and succinic acid, and (3) epimeric mixtures of a crystallizable salt of a base and the acid succinate ester of 2d-α-tocopherol, and a crystallizable salt of said base and the acid succinate ester of 2l-α-tocopherol, a product wherein one epimer is at a weight ratio relative to the other epimer substantially greater than the weight ratio of said one epimer to said other epimer in said epimeric material, which comprises: (1) dissolving said epimeric material in a crystallization solvent therefor, whereby a solution is formed; (2) changing the temperature of said solution to a temperature at which a substantial quantity of said epimeric material is insoluble in said solvent, whereby crystalline solids are precipitated from said solution; and (3) separating said solids from the resulting mother liquor, whereby said product is obtained.

2. A process according to claim 1 wherein said solids are said product.

3. A process for obtaining from epimeric material selected from the group consisting of (1) mixtures of 2d-α-tocopherol and 2l-α-tocopherol, (2) epimeric mixtures of a crystallizable ester of 2d-α-tocopherol and an optically inactive acid, and a crystallizable ester of 2l-α-tocopherol and said acid, said acid being selected from the group consisting of saturated aliphatic carboxylic acids having 1–24 carbon atoms, benzoic acid, p-phenylazobenzoic acid and succinic acid, and (3) epimeric mixtures of a crystallizable salt of a base and the acid succinate ester of 2d-α-tocopherol, and a crystallizable salt of said base and the acid succinate ester of 2l-α-tocopherol, a product wherein one epimer is at a weight ratio relative to the other epimer substantially greater than the weight ratio of said one epimer to said other epimer in said epimeric material, which comprises: (1) dissolving said epimeric material in a crystallization solvent therefor, whereby a solution is formed; (2) changing the temperature of said solution to a temperature at which a substantial quantity of said epimeric material is insoluble in said solvent, and seeding said solution with at least one crystal of the epimer at the greater weight ratio relative to the other epimer in the crystalline solids subsequently precipitated from said solution, whereby crystalline solids are precipitated from said solutions; and (3) separating said solids from the resulting mother liquor, whereby said product is obtained.

4. A process according to claim 3 wherein said epimeric material consists essentially of 2dl-α-tocopheryl acetate and wherein said solids, which consist essentially of 2d-α-tocopheryl acetate at a weight ratio of 2l-α-tocopheryl acetate substantially greater than 1:1, are said product.

5. A process for separating an epimer from epimeric material selected from the group consisting of (1) mixtures of 2d-α-tocopherol and 2l-α-tocopherol, (2) epimeric mixtures of a crystallizable ester of 2d-α-tocopherol and an optically inactive acid, and a crystallizable ester of 2l-α-tocopherol and said acid, said acid being selected from the group consisting of saturated aliphatic carboxylic acids having 1–24 carbon atoms, benzoic acid, p-phenylazobenzoic acid and succinic acid, and (3) epimeric mixtures of a crystallizable salt of a base and the acid succinate ester of 2d-α-tocopherol, and a crystallizable salt of said base and the acid succinate ester of 2l-α-tocopherol, which comprises: (1) dissolving said epimeric material in a crystallization solvent therefor, whereby a solution is formed; (2) changing the temperature of said solution to a temperature at which a substantial quantity of said epimeric material is insoluble in said solvent, whereby crystalline solids are precipitated from said solution; (3) separating said solids from the resulting mother liquor, whereby a crystal fraction is obtained; (4) dissolving said crystal fraction in a crystallization solvent therefor; (5) repeating steps (2) and (3), whereby another crystal fraction is obtained; and (6) repeating steps (4) and (5) until a crystal fraction consisting essentially of said epimer substantially free of the other epimer is obtained.

6. A process for separating an epimer from epimeric material selected from the group consisting of (1) mixtures of 2d-α-tocopherol and 2l-α-tocopherol, (2) epimeric mixtures of a crystallizable ester of 2d-α-tocopherol and an optically inactive acid, and a crystallizable ester of 2l-α-tocopherol and said acid, said acid being selected from the group consisting of saturated aliphatic carboxylic acids having 1–24 carbon atoms, benzoic acid, p-phenylazobenzoic acid and succinic acid, and (3) epimeric mixtures of a crystallizable salt of a base and the acid succinate ester of 2d-α-tocopherol, and a crystallizable salt of said base and the acid succinate ester of 2l-α-tocopherol, which comprises: (1) dissolving said epimeric material in a crystallization solvent therefor, whereby a solution is formed; (2) changing the temperature of said solution to a temperature at which a substantial quantity of said epimeric material is insoluble in said solvent, and seeding said solution with at least one crystal of said epimer, whereby crystalline solids are precipitated from said solution; (3) separating said solids from the resulting mother liquor, whereby a crystal fraction is obtained; (4) dissolving said crystal fraction in a crystallization solvent therefor; (5) repeating steps (2) and (3), whereby another crystal fraction is obtained; and (6) repeating steps (4) and (5) until a crystal fraction consisting essentially of said epimer substantially free of the other epimer is obtained.

7. A process according to claim 6 wherein said epimeric material consists essentially of 2dl-α-tocopherol acetate and said epimer is 2d-α-acetate.

8. A process according to claim 7 wherein said crystallization solvent consists essentially of ethanol and step (2) is carried out by cooling said solution.

9. A process according to claim 6 wherein (a) the mother liquors are combined, (b) the solvent content is adjusted so that on changing the solution temperature to a crystallization temperature whereat the material dissolved by said solvent is less soluble therein a substantial quantity of crystalline solids will precipitate, (c) the solution temperature is changed to said crystallization temperature and at least one crystal of said other epimer is added, whereby crystalline solids are precipitated, (d) said solids are separated from the resulting mother liquor, whereby a crystal fraction is obtained, (e) said crystal fraction is dissolved in a crystallization solvent therefor, (f) steps (c) and (d) are repeated whereby another crystal fraction is obtained, and steps (e) and (f) are repeated until a crystal fraction consisting essentially of said other epimer substantially free of said epimer is obtained.

10. In a process for converting 2l-α-tocopherol to 2d-α-tocopherol, wherein a mixture of 2d-α-tocopherol and 2l-α-tocopherol is obtained, the steps of (1) dissolving said mixture in a crystallization solvent therefor, whereby a solution is formed; (2) changing the temperature of said solution to a temperature at which at least a substantial portion of the mixture is insoluble in said solvent, whereby crystalline solids are precipitated from said solution; (3) separating said solids from the resulting mother liquor, whereby a crystal fraction is obtained; (4) dissolving said crystal fraction in a crystallization solvent therefor; (5) repeating steps (2) and (3) whereby another crystal fraction is obtained; and (6) repeating steps (4) and (5) until a crystal fraction consisting essentially of 2d-α-tocopherol of the desired degree of purity is obtained.

11. In a process for converting 2l-α-tocopherol to 2d-α-tocopherol, wherein the 2l epimer is redduced to 2l-α-tocohydroquinone and the 2l-α-tocohydroquinone is cyclized under conditions which yield a mixture of the 2d and 2l epimers, the steps of (1) dissolving said mixture in a crystallization solvent therefor, whereby a solution is formed; (2) changing the temperature of said solution to a temperature at which at least a substantial portion of the mixture is insoluble in said solvent, whereby crystalline solids are precipitated from said solution; (3) separating said solids from the resulting mother liquor, whereby a crystal fraction is obtained; (4) dissolving said crystal fraction in a crystallization solvent therefor; (5) repeating steps (2) and (3) whereby another crystal fraction is obtained; and (6) repeating steps (4) and (5) until a crystal fraction consisting essentially of 2d-α-tocopherol of the desired degree of purity is obtained.

12. A process according to claim 11 wherein said final crystal fraction is substantially free of 2l-α-tocopherol.

13. A process according to claim 11 wherein 2l-α-tocopherol is separated from the mother liquors and recycled.

References Cited
UNITED STATES PATENTS

| 2,215,398 | 9/1940 | Karrer | 260—341.5 |
| 3,153,053 | 10/1964 | Robeson et al. | 260—345.6 |

WALTER A. MODANCE, *Primary Examiner.*

JOHN M. FORD, *Assistant Examiner.*